Jan. 24, 1933.   A. J. SANDE   1,895,234
APPARATUS FOR SPLICING CABLES AND ROPES
Filed July 1, 1932
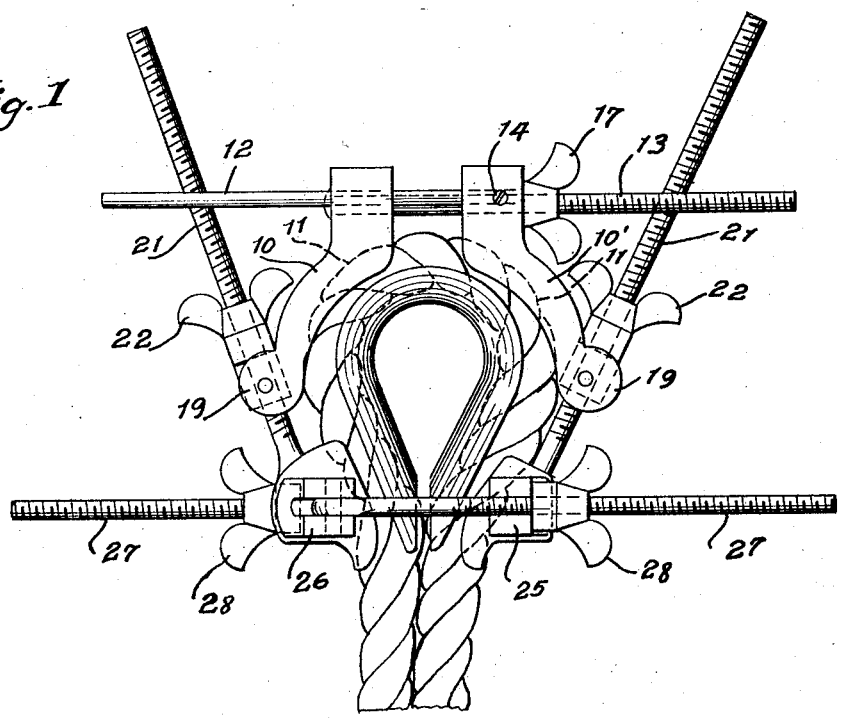
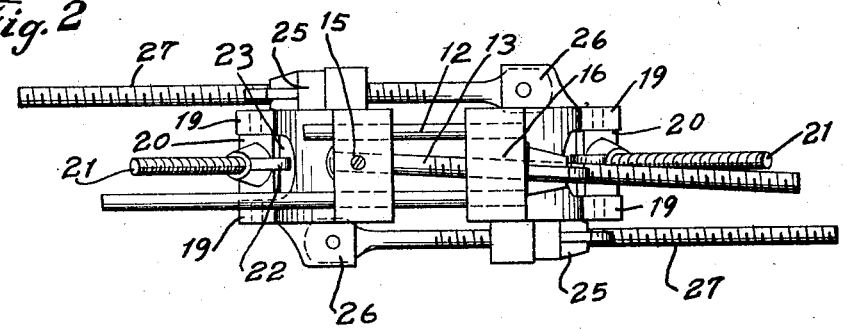
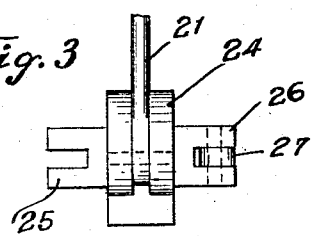
INVENTOR
*Anders J. Sande*
BY
*Peter M. Boesen*
ATTORNEY Patented Jan. 24, 1933

1,895,234

UNITED STATES PATENT OFFICE

ANDERS J. SANDE, OF BROOKLYN, NEW YORK

APPARATUS FOR SPLICING CABLES AND ROPES

Application filed July 1, 1932. Serial No. 620,386.

This invention relates to new and useful improvements in apparatus for splicing cables and ropes, and has for its object the provision of an apparatus, which is easy to operate, convenient to transport, and which will readily lend itself to be adjusted to any size of cable or rope to be spliced, although the said device for the latter purpose may be manufactured in different sizes. The said device is preferably made of metal.

As the construction of this invention is comparatively simple, the cost of manufacturing should be so low as to secure a great market for the latter.

With the above and other objects in view, this invention consists of the novel features of construction, combination and arrangement of parts, hereinafter fully described, claimed and illustrated in the accompanying drawing forming part of this specification, and in which similar characters of reference indicate corresponding parts in all views, and in which:

Figure 1 is a plan elevational view of my device, shown in operation.

Figure 2 is a top plan view of the latter; while

Figure 3 is a detail view of the lower left hand joint and a portion of the upwardly extending rod; the said joint being herein shown at a 90 degree angle to the view in Figure 1.

Referring more particularly to the drawing, the top-section of my device comprises the members 10 and 10′, which latter are formed alike, and with somewhat curved inner surfaces to accommodate a cable or rope, held by the device for the purpose of being spliced. The said rope, as positioned in the said curved portion of the members 10 and 10′ is shown in dotted lines indicated by 11. The members 10 and 10′ are adapted to be adjusted, relevant to one another, by sliding on the bars 12, 12 and 13, of which the bars 12, 12 are solidly secured to the one member 10′, as by welding, or by a set-screw, as indicated at 14, while the bar 13 is solidly secured to the other member 10, in like manner, as indicated at 15. The sections 10 and 10′ are formed with horizontal openings, respectively, as shown in dotted lines in order to accommodate the said bars 12, 12 and 13. The horizontal openings in the members 10 and 10′, for accommodating the bar 13, are however arranged in a slightly oblique manner, as shown in dotted lines and especially noticeable in Figure 2 at 16, in order to make it possible to manipulate the regulating wing-nut 17 upon the member 13 without interfering with one of the upwardly projecting side bars 21. The members 10 and 10′ being secured together, tightened and adjusted by means of the wing-nut 17.

The outer sides, respectively, of the members 10 and 10′ are formed with outwardly projecting bifurcated sections 19 adapted to pivotally receive therein substantially square-shaped rollers 20, which latter in turn are formed with screwthreaded holes to adjustably receive therein the side bars 21, which thus can move freely in a lateral direction. The said bars 21 are adjusted by means of wing-nuts 22; and in order to make sufficient clearance for the manipulation of the latter, the members 10 and 10′ are formed upon their upper, outer sides with slightly reduced portions, as may readily be seen at 23 in Figure 2.

Each one of the bars 21 is below hingedly attached to a clutch-member 24. The said clutch-members are formed with oppositely disposed bifurcated sections 25 and 26; and in one of the said bifurcated sections each clutch-member has pivotally mounted a bar 27, as shown at 26, in such a manner that when the device is locked, as shown in Figure 1, the said bars 27 will be positioned, respectively, above and below the rope to be spliced; the respective ends of the said bars will then rest in the other, or open, bifurcated sections 25 of the said clutch members, while wing-nuts 28, after due relative adjustment of the respective cooperating members, will secure the device in a tightly locked position upon and embracing the rope to be spliced.

It being understood that all of the said bars are suitably threaded for the purpose described.

It is obvious that changes may be made in the form, construction and arrangement of the several parts, as shown, within the scope of the appended claims, without departing from the spirit of the invention, and I do not therefore wish to limit myself to the construction and arrangement shown and described herein.

What I claim as new, and desire to secure by Letters Patent of the United States, is:

1. A device of the class described, comprising two top-sections formed with slightly curved inner surfaces, means for adjustably securing the upper parts of the two top-sections together, two clutch-members, each one of the latter having two bars pivotally mounted therein, and means arranged upon the two top-sections for receiving and adjusting, relatively to the latter, one upwardly projecting bar from each of the said clutch-members, and further means arranged upon each clutch-member for receiving the second bar of the other clutch-member in interlocking the said clutch-members.

2. A device of the class described, comprising two top-sections formed with slightly curved inner surfaces to receive and embrace a rope doubled upon itself, and means for adjustably securing the upper parts of the two top-sections together, the said top-sections being each formed with bifurcated projections, rollers pivotally mounted between the latter and adapted to receive upwardly extending rods, two clutch-members, each of these pivotally supporting one of the said upwardly extending rods, a second rod pivotally mounted upon each of the said clutch-members, and means formed upon the latter to receive the said rods in interlocking position with the said clutch-members.

3. A device of the class described, comprising two top-sections formed with slightly curved inner surfaces to receive and embrace a rope doubled upon itself, and means for adjustably securing the upper parts of the two top-sections together, the said top-sections being each formed with bifurcated projections, block-members, having openings therein, and being pivotally mounted between the latter, two clutch-members, each one of these having two bars pivotally mounted therein at substantially a 90 degree angle to one another, one of the bars of each of the said clutch-members engaging one of the said block-members, respectively, and means formed upon each clutch-member for engaging the second bar of the other clutch-member in interlocking position, and wing-nuts threaded upon the said bars for adjusting and securing the different parts tightly together.

Signed at New York city, in the county of New York and State of New York, this 18th day of April, A. D. 1932.

ANDERS J. SANDE.